United States Patent
Yang

(10) Patent No.: US 9,678,349 B2
(45) Date of Patent: Jun. 13, 2017

(54) TRANSPARENT TYPE NEAR-EYE DISPLAY DEVICE

(71) Applicant: Tsai-Hsien Yang, Taoyuan (TW)

(72) Inventor: Tsai-Hsien Yang, Taoyuan (TW)

(*) Notice: Subject to any disclaimer, the term of this patent is extended or adjusted under 35 U.S.C. 154(b) by 169 days.

(21) Appl. No.: 14/643,515

(22) Filed: Mar. 10, 2015

(65) Prior Publication Data

US 2016/0238850 A1     Aug. 18, 2016

(30) Foreign Application Priority Data

Feb. 17, 2015  (TW) .............................. 104105509 A

(51) Int. Cl.
  *G02B 27/01*   (2006.01)
  *G02B 27/00*   (2006.01)

(52) U.S. Cl.
  CPC ..... *G02B 27/0176* (2013.01); *G02B 27/0093* (2013.01); *G02B 27/017* (2013.01); *G02B 27/0172* (2013.01); *G02B 2027/014* (2013.01); *G02B 2027/0138* (2013.01); *G02B 2027/0159* (2013.01); *G02B 2027/0169* (2013.01); *G02B 2027/0178* (2013.01)

(58) Field of Classification Search
  CPC combination set(s) only.
  See application file for complete search history.

(56) References Cited

U.S. PATENT DOCUMENTS

| | | | |
|---|---|---|---|
| 8,508,830 B1 | 8/2013 | Wang | |
| 8,582,209 B1 | 11/2013 | Amirparviz | |
| 8,767,305 B2 | 7/2014 | Spitzer et al. | |
| 2004/0165060 A1* | 8/2004 | McNelley | H04N 7/144 348/14.08 |
| 2011/0213664 A1* | 9/2011 | Osterhout | G02B 27/017 705/14.58 |
| 2014/0152530 A1* | 6/2014 | Venkatesha | G01B 11/00 345/8 |

* cited by examiner

*Primary Examiner* — Van Chow
(74) *Attorney, Agent, or Firm* — patenttm.us

(57) ABSTRACT

The present invention relates to a transparent near-eye display device. The near-eye display device includes a main case providing a containing space to include an electronic component assemble; a see-through display unit mechanically connected with the main case and electrically connected with the electronic component assemble; and an attaching unit configured on the main case and attachable to a spectacle-based frame.

10 Claims, 4 Drawing Sheets

TRANSPARENT TYPE NEAR-EYE DISPLAY DEVICE

FIELD

The present invention relates to a near-eye display device. In particular, it relates to a transparent type near-eye display device which is detachable from a spectacle frame, and has a flipable-type see-through display and a magnetic north orientation capability.

BACKGROUND

A near-eye display (also termed as a near-to-eye display) device is a type of novel wearable device that creates a display in front of a user's field of vision. On the display, various digital contents, received and provided from an external device such as a smart phone, a tablet or a notebook computer, including images, graphics, web pages, emails and digital maps can be shown. The imaging display utilized in a near-eye display device may be transparent or opaque. Depending on the display type, the device is generally categorized into two major types, which one is a transparent type device while another is an opaque-type device.

For an opaque-type device, an opaque display is used in the device and shows digital contents to a user. The opaque-type device can use the conventional liquid crystal panel as the opaque display and is much easier to create an immersive theater-like digital content to users as compared with the transparent type device. The opaque-type near-eye display device is often applied as a tool to realize a virtual reality technology. As to a transparent type device, a see-through type display, which allows a user to see the reality world through a transparent display while in the meantime the digital contents shows on the transparent display, is used in the device. The transparent type near-eye display device is often applied as a tool to realize an augmented reality technology. Visually the reality world seems to act as a background, while the transparent display shows contents.

In particular to a transparent type device, the most famous transparent type device product definitely is the Google glass. The Google glass develops a basic structure for the transparent type near-eye display device, which structure becomes very popular in the state of the art. The structure typically consists of a spectacle-like frame and a see-through display mounted to the frame. The near-eye display device employs a regular optical system as disclosed in U.S. Pat. No. 8,767,305 to act as the optical system. This optical system is configured to have an optical imaging engine, a polarizing beam splitter and a concave reflector. Usually, the optical imaging scheme is technically divided into two kinds of major imaging technologies, which one is a liquid crystal on silicon ("LCOS") based technology and another is a digital light processing ("DLP") based technology. The optical imaging engine generates a light beam containing digital contents to be shown on the display and transmits it to the splitter and the reflector. Finally the digital contents are reflected into the user's eyes and a magnified virtual image is reimaged in front of user's eyes.

However, the transparent type device still has multiple defects and shortages which cause inconveniences to a user. For instances, the near-eye display device is bounded to the spectacle frame having a style that may be unsuitable for the user or the user may dislike. In some occasions, although the device uses a see-through display, the digital contents shown on the transparent display may partly block or shelter user's eyesight, since the display is configured right in front of the user' eyes and the line of user's eyesight. While the device is in use, the partial block to the eyesight from the transparent display leads to a safety issue, particularly when a user is in movement or walk. Furthermore, as if a user moves, she/he must continuously need orientation guidance or route navigation, especially provided from such a near-eye display device.

There is a need to solve the above deficiencies/issues.

SUMMARY

The present invention provides a transparent near-eye display device. The present transparent type near-eye display device is detachable from a spectacle frame, and has a flipable-type see-through display and a magnetic north direction tracking capability.

This near-eye display device includes a main case providing a containing space to include an electronic component assemble; a see-through display unit mechanically connected with the main case and electrically connected with the electronic component assemble; and an attaching unit configured on the main case and attachable to a spectacle-based frame.

Preferably, the near-eye display device further includes one of units as follows: a rotatable connection unit, by which the see-through display unit is mechanically and rotatably connected with the main case; a flipable connection unit, by which the see-through display unit is mechanically and flipably connected with the main case; and an external device connecting port for electrically connecting with an external device.

The present near-eye display device can be diversely applied to many different domains including mobile social activates, mobile advertisement, real-time texts translation, real-time image recognition, mobile navigation, real-time traffic information, public security, mobile education, virtual reality education, remote telemedicine, real-time civil engineering, on-site construction, real-time oral translation, oversea business, sightseeing tour virtual guider and so on. It is apparently anticipated that the device will deeply results in a tremendous paradigm-shift-like influence to human and bring great conveniences into human life.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1A:
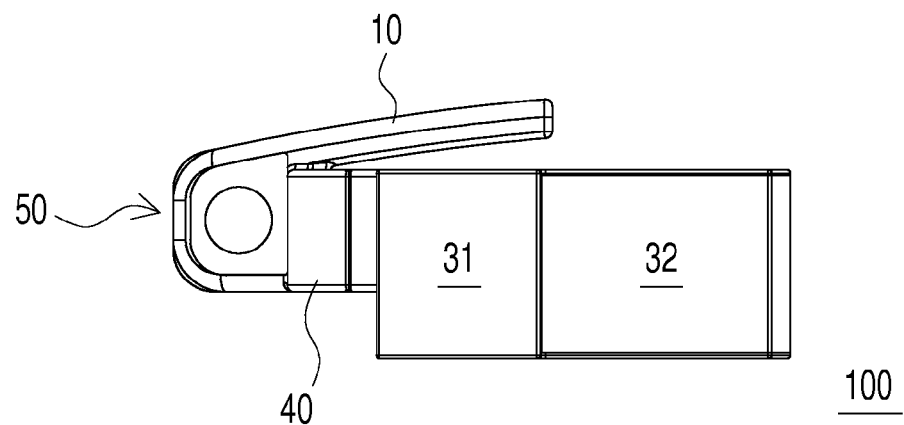
FIG. 1(a) is a front view schematic diagram illustrating the near-eye display device according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "comprising" or "including", used in the claims and specification, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Figure 1B:
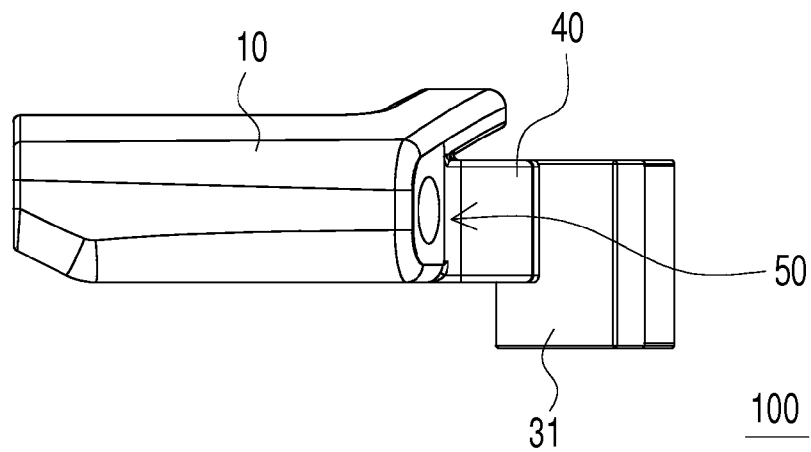
FIG. 1(b) is a left-hand side view schematic diagram illustrating the near-eye display device according to the present invention.
Figure 1C:
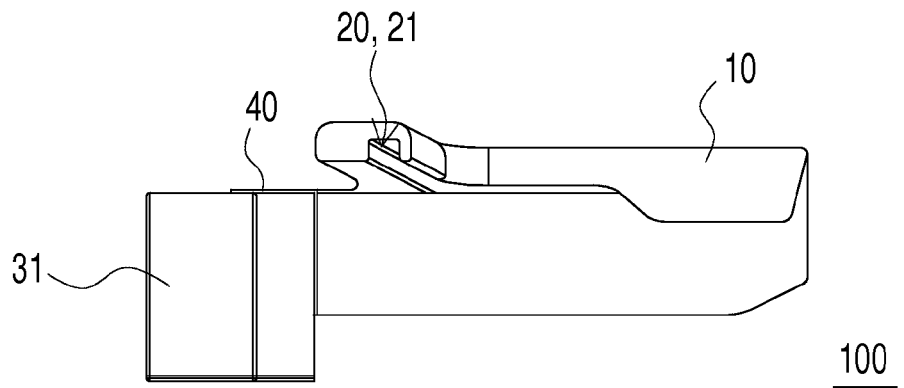
FIG. 1(c) is a right-hand side view schematic diagram illustrating the near-eye display device according to the present invention.
Figure 1D:
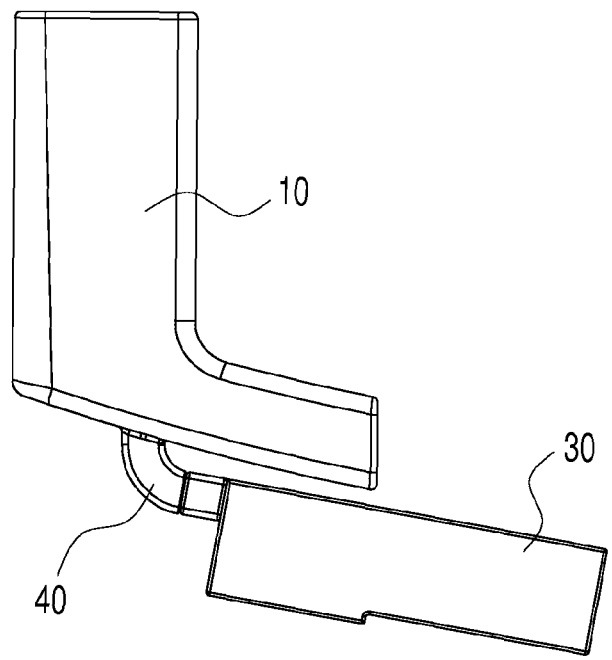
FIG. 1(d) is a top view schematic diagram illustrating the near-eye display device according to the present invention.
Figure 1E:
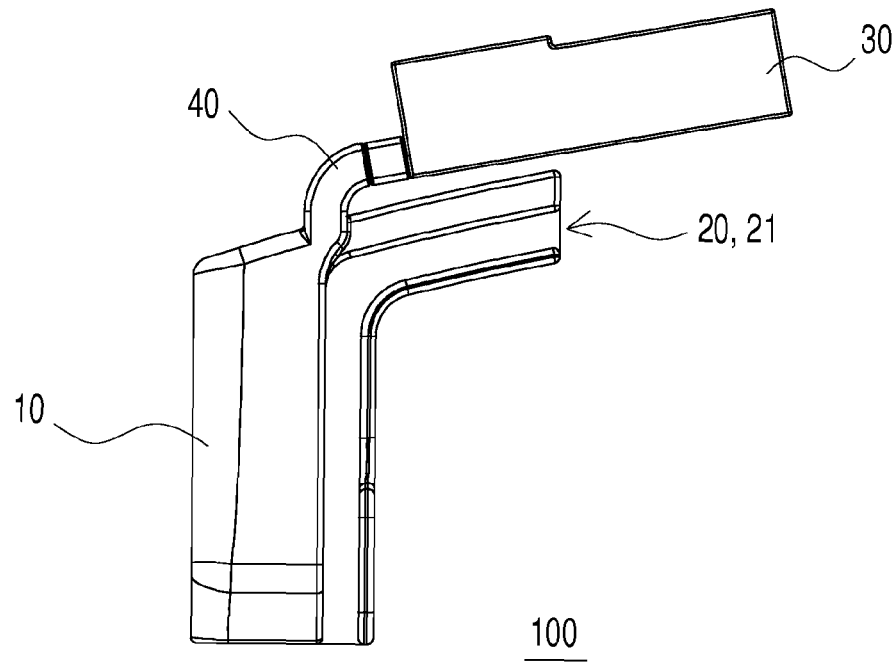
FIG. 1(e) is a bottom view schematic diagram illustrating the near-eye display device according to the present invention.

Please refer to FIG. 1(a) to FIG. 1(e). FIG. 1(a) is a front view schematic diagram illustrating the near-eye display device according to the present invention. FIG. 1(b) is a left-hand side view schematic diagram illustrating the near-eye display device according to the present invention. FIG. 1(c) is a right-hand side view schematic diagram illustrating the near-eye display device according to the present invention. FIG. 1(d) is a top view schematic diagram illustrating the near-eye display device according to the present invention. FIG. 1(e) is a bottom view schematic diagram illustrating the near-eye display device according to the present invention.

The near-eye display device 100 includes a main case 10, an attaching unit 20, a see-through display unit 30 and a rotatable connection unit 40 (a flipable connection unit). The attaching unit 20, the see-through display unit 30 and the rotatable connection unit 40 are disposed on the main case 1. A micro camera lens 50 is configured inside a containing space (not shown) provided by the main case 10. The main case 10 is made of, such as, plastic or alloy, and is used for providing the multiple units 20, 30 and 40 to be assembled thereon and for containing the micro camera lens 50 and an electronic component assemble which includes such as an 9-axis electronic motion sensor module including, for instance, a 3-axis electronic compass, a 3-axis electronic gyroscope, a 3-axis electronic accelerometer, a micro processor module, an active micro power module (a battery, for instance), a wireless communication module, a micro camera module and so on therein. The micro camera lens 50 has a line of camera sight and is configured in such way that the line of camera sight is substantively parallel to a line of user's eyesight, so as to record a scene whatever user sees in synchronization.

The attaching unit 20 configured on the main case 10 is capable of attaching to a spectacle-based frame. In order to securely attach to the spectacle frame, for instance, the attaching unit 20 is preferably configured to have a groove 21, as shown in FIG. 1(c) and FIG. 1(e), which is formed on the attaching unit 20. The groove 21 has cross-section with a shape in conformity with a spectacle temple part and a frame rim part on the spectacle whereby the spectacle temple and the frame rim can thus embed or be clipped into the groove 21, so that the near-eye display device 100 can be entirely attached to the spectacle frame if needed and the near-eye display device 100 can be detached from the spectacle frame after use. Moreover, the groove 21 is formed with a cross-section shape such a curved shape, a rectangular shape or any other adequate shape capable of attaching to the frame. The implementation of the attaching unit 20 is not limited to the groove 21 and is preferably one selected from a groove based component, a clip based component, a clamp based component and a hook-loop fastener. Accordingly, the near-eye display device 100 can be regarded as an attachable device or a detachable device.

The see-through display unit 30 is a transparent display and a user can still see the actual surrounding environment (reality world) through the transparent display, while the static or the dynamic virtual digital contents is shown on the transparent display. The see-through display unit 30 preferably belongs to a head-mounted display (HMD). In this embodiment, the see-through display unit 30 simply includes an optical imaging engine 31 and a transparent prism 32. The optical imaging engine 31 is an imaging chip functioned upon either an active quantum dot technology (as disclosed in U.S. Pat. No. 8,508,830 or U.S. Pat. No. 8,582,209, for instance), a digital light processing (DLP) based technology or a liquid crystal on silicon (LCOS) based technology. The digital contents to be shown are generated first generated from the optical imaging engine 31 and then projected to the transparent prism 32. The transparent prism 32 acts as a transparent screen and is formed with a concave reflector to provide the digital contents to re-image on the transparent prism 32. When the user sees the digital contents to be shown on the prism 32 and in the meanwhile the user can still see the scene of reality world like a background appearing behind the shown digital contents.

Figure 2A:
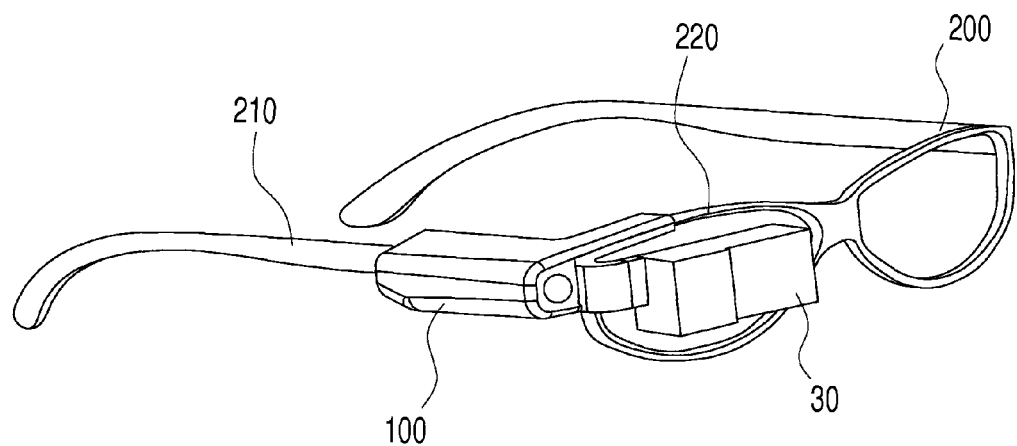
FIG. 2(a) is a perspective view schematic diagram illustrating an attached status for the near-eye display device according to the present invention viewed approximately from an upper-front view, in which status the near-eye display device is combined with the spectacle frame.
Figure 2B:
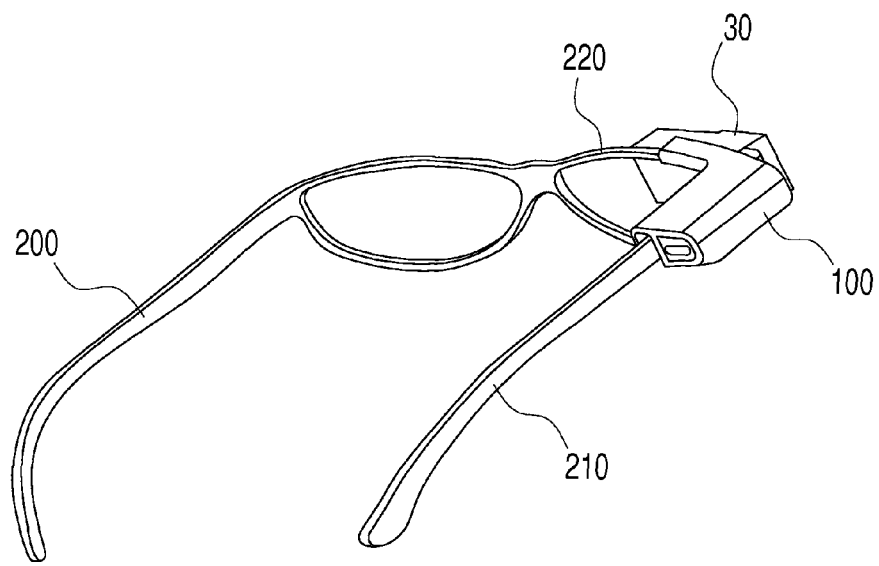
FIG. 2(b) is a perspective view schematic diagram illustrating an attached status for the near-eye display device according to the present invention viewed approximately from an upper-rear view, in which status the near-eye display device is linked to the spectacle frame.

Please refer to FIG. 2(a) to FIG. 2(b). FIG. 2(a) is a perspective view schematic diagram illustrating an attached status for the near-eye display device according to the present invention viewed approximately from an upper-front view, in which status the near-eye display device is combined with the spectacle frame. FIG. 2(b) is a perspective view schematic diagram illustrating an attached status for the near-eye display device according to the present invention viewed approximately from an upper-rear view, in which status the near-eye display device is linked to the spectacle frame.

The near-eye display device 100 in FIG. 2(*a*) and FIG. 2(*b*) is attached to the spectacle frame 200 via the attaching unit configured on the main case. The groove (invisible in FIG. 2(*a*) and FIG. 2(*b*)) on the device 100 is capable of clipping the spectacle temple 210 and the spectacle rim 220, rendering the near-eye display device 100 to be securely attached to the spectacle frame 200, as shown in FIG. 2(*a*) and FIG. 2(*b*). After the device 100 is attached to the spectacle frame 100, the see-through display 30 appears in front of user's eyesight while use.

The near-eye display device 100 according to the present invention can be electrically connected with an external device, such as a smart phone, a tablet or a notebook computer, through a wireless communication way, such as a Bluetooth protocol, a Wi-Fi (802.11abgn) protocol, or a wired communication way, such as a USB-OTG (Universal Serial Bus On-The-Go) or a Thunderbolt connecting port. The active micro power module on the device 100 can be charged through the USB-OTG or Thunderbolt port or charged through the USB-OTG or Thunderbolt port from the external device.

However, although the see-through display unit 30 is a transparent screen, the digital contents shown on the transparent display may inevitably block or shelter a part of user's eyesight since under an regular use status, the display appears in front of the user's both eyes. Hence, while the device is in use, resulting in a safety issue, particularly when a user is in movement or walk.

Figure 3A:
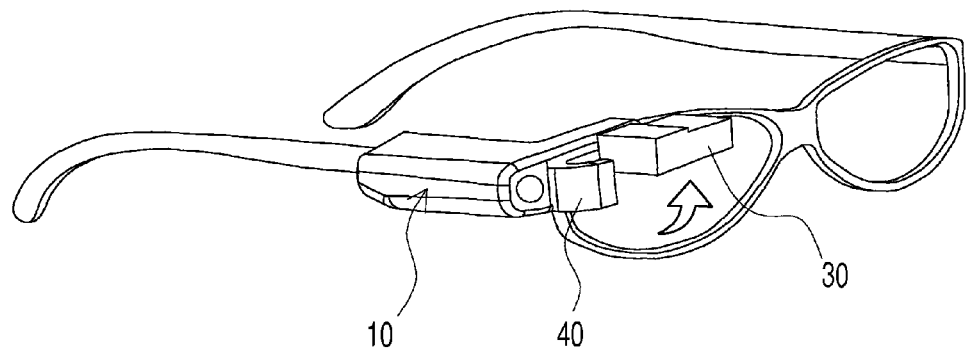
FIG. 3(a) is a perspective view schematic diagram illustrating a use status for the near-eye display device according to the present invention, in which status the see-through display unit is flipped up to an upper side of the spectacle frame.
Figure 3B:
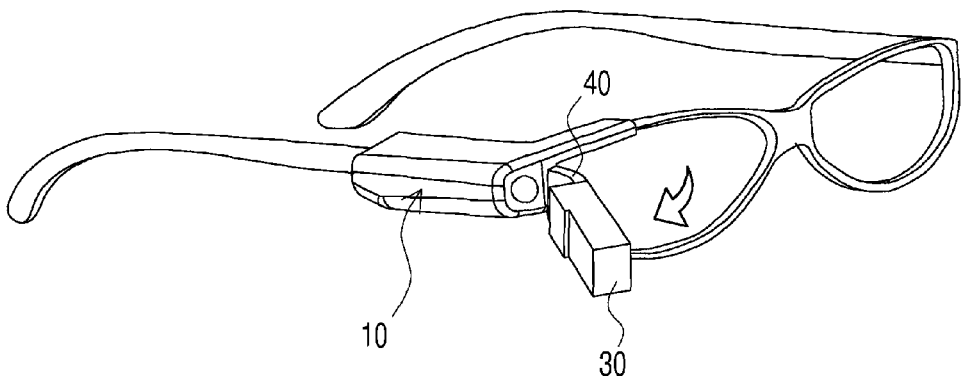
FIG. 3(b) is a perspective view schematic diagram illustrating a use status for the near-eye display device according to the present invention, in which status the see-through display unit is rotated/flipped to a lateral side of the spectacle frame.

Please refer to FIG. 3(*a*) to FIG. 3(*b*). FIG. 3(*a*) is a perspective view schematic diagram illustrating a use status for the near-eye display device according to the present invention, in which status the see-through display unit is flipped up to an upper side of the spectacle frame. FIG. 3(*b*) is a perspective view schematic diagram illustrating a use status for the near-eye display device according to the present invention, in which status the see-through display unit is rotated/flipped to a lateral side of the spectacle frame.

Thus, a rotatable connection unit 40 (also equivalent to a flipable connection unit) is used for rotatably/flipably linking both the see-through display unit 30 and the main case 10. For instance, the rotatable connection unit 40 is preferably a hinge-based component or a flipable connection component. Via the flipable linkage of the rotatable connection unit 40, the see-through display unit 30 can be flipped, rotated or moved away from the user's eyesight. For instance, the see-through display unit 30 is capable of being flipped up to an upper side of the frame, as shown in FIG. 3(*a*), or rotated to a lateral side, as shown in FIG. 3(*b*), of the spectacle frame, and user can regain the original full range of field of vision.

The present near-eye display device introduces the rotatable connector to rotatably/flipably connect both the see-through display unit 30 and the main case 10. The see-through display unit 30 is electrically connected to the micro processor module disposed in the main case 10 preferably by such as a water-resistant flexible plastic cable or a water-resistant flexible printed circuit therebetween.

Therefore, due to the installation of the rotatable connection unit 40, the user can move the display unit 30 into the field of eyesight to see the virtual digital contents shown on the display unit 30 while needed, and can move the display unit 30 away from the field of eyesight to recover clear and unsheltered eyesight while unneeded.

In addition, the present near-eye display device can actively initiate to perform a magnetic north search process to continuously orientate and indicate the magnetic north direction on the see-through display to a user by using a built-in application program (App) recorded in the micro processor module. The App cooperates with the electronic compass, accelerometer and gyroscope in the motion sensor module to find out the magnetic north direction.

After connected with the smart phone by the connector, a first magnetic north search and correction scheme in App is automatically initiated on the device. And a user can follow the calibration process instruction of the App to eliminate the other electromagnetic interferences occurring around a near field of the near-eye display device. Then the user can put the smart phone into the pocket on garment, just hang it in front of chest, or put it into the pocket of the sport armband on the arm. After this, the operating scenes are directly projected to and continuously shown on the see-through display.

A micro air mouse secured on fingertip or wrist is involved in to replace the conventional touch-based control to command the smart phone. The air mouse is wirelessly electrically connected with the smart phone through the wireless communication module, such as a Bluetooth protocol. Then the user can command, control and operate the whole process by using the air mouse. Thus during whole process, user's both hands are to be totally set free from operating. Finally the App can automatically search out and point out the magnetic north direction by using the electronic compass.

After the complete of the searching and correcting process, the App turns off the electronic compass. The discrepancy between a forward moving direction in front of user's face with respect to the magnetic north direction is subsequently detected and computed by using the electronic gyroscope. Then the computed discrepancy is immediately shown on the see-through display in a graph-based scheme, such as using an indicator or an arrow-shape based symbol. Hence, no matter how user moves, toward which direction user moves, or how user spins or turns around, the magnetic north direction can be always indicated and pointed out on the see-through display continuously and known to the user. The user can not only know toward which diction she/he currently moves, but can also realize to which major directional sector, such as, an east sector, a south sector, a west sector, a north sector, a southeast sector, a northwest sector, a southwest sector or a northeast sector, the current moving direction belongs. In accordance, the App can even further rotate or adjust the digital map or 3D virtual images shown on the see-through display in real time, to align with the user's current moving direction automatically. Because the electronic compass is already turned off, even though the user passes by or goes through a region having multiple electromagnetic interferences, the orientation to the magnetic north is never affected or interfered and keeps functioning and operating normally and accurately. The user won't be misled to move toward a wrong direction.

A second magnetic north search and correction scheme in App is introduced herein, and implemented if there are electromagnetic interferences occurring around a near field of the near-eye display device where the geomagnetic field fails to be accurately measured or detected.

The App actively begins to activate the micro camera to acquire near-field images from surrounding environment where the near-eye display device currently stays in, and finds out and extracts multiple landscape features, such as a landmark, a current scene, a street view, a significant building, an environmental pattern, characters or texts on any road sign, form the acquired images. Then the App accesses to an internet cloud data base to compare the extracted features with the landscape information storing in the database, to try to identify the current position, so as to further orientate the correct magnetic north direction. During the second process, the App might request user to rotate her/his head part in order to sufficiently collect information as much as possible from surrounding images. Since in this scheme, a computing capability is heavily demanded, the App commands the device to access to a powerful grid computing resource.

A third magnetic north search and correction scheme in App is introduced therein, as long as if a GPS signal can be normally detected and received by the external device such as a smart phone. The App actively begins to wake up the GPS receiving module on the smart phone and the motion sensor module on the near-eye display device, and then the App guides the user to freely move forward any direction but in a straight line. The App measures the distance the user moves. Once user moves a distance over 30 meters, the App commands to send out an appropriate signal, such as a beep sound or a vibration, to inform user to return back to the original location. Accordingly, the App can compute and identify the magnetic north depending upon the signals from the GPS and electronic gyroscope.

To briefly sum up, the first scheme can be implemented at any location, including the under-ground building or facility, as long as if there is none of intense electromagnetic interferences around the near-eye display device. The second scheme can be implemented preferably at location where the wireless telecommunication signals can be duly received, since the scheme has mega data and lot of computing duties to transmit and to compute, and thus the supports from a cloud database or a grid computation are much demanded. The third scheme can be implemented at any location, preferably an outdoor field, as long as if a GPS signal can be well received. Although through the computation based on the GPS signal, the correct magnetic north direction can be very precisely obtained, but a GPS signal can be well and only received in an outdoor field and an open area is also necessary to allow the device moving long enough.

For an actual use, the user can autonomously or selectively switches among above-mentioned multiple schemes or the App can also automatically or selectively switches among schemes depending upon the current circumstance which the device currently stays in. By wearing the present near-eye display device, any user can simply know the direction-related information or location-based information, and enter into an unlimited augmented reality world.

The present near-eye display device can be applied to very diverse field including mobile social activates, mobile advertisement, real-time texts translation, real-time image recognition, mobile navigation, real-time traffic information, public security, mobile education, virtual reality education, remote telemedicine, real-time civil engineering, on-site construction, real-time oral translation, oversea business, sightseeing tour virtual guider and so on. It is apparently anticipated that the device will deeply results in a tremendous paradigm-shift-like influence to human and bring great conveniences into human life.

There are further embodiments provided as follows.

Embodiment 1 a near-eye display device includes a main case providing a containing space to include an electronic component assemble; a see-through display unit mechanically connected with the main case and electrically connected with the electronic component assemble; and an attaching unit configured on the main case and attachable to a spectacle-based frame.

Embodiment 2 the near-eye display device as described in Embodiment 1 further includes one of units as follows: a rotatable connection unit, by which the see-through display unit is mechanically and rotatably connected with the main case; a flipable connection unit, by which the see-through display unit is mechanically and flipably connected with the main case; and an external device connecting port for electrically connecting with an external device.

Embodiment 3 the near-eye display device as described in Embodiment 2, the external device connecting port is selected from a universal serial bus on-the-go (USB-OTG) connecting port and a Thunderbolt connecting port.

Embodiment 4 the near-eye display device as described in Embodiment 2, the external device is one selected from a smart phone, a tablet and a notebook computer.

Embodiment 5 near-eye display device as described in Embodiment 1, the attaching unit is one selected from a groove based component, a clip based component, a clamp based component and a hook-loop fastener, wherein the groove based component is formed with a curved shape or a rectangular shape.

Embodiment 6 the near-eye display device as described in Embodiment 1, the see-through display unit is electrically connected with the electronic component assemble by a flexible water-resistance electrical connector.

Embodiment 7 the near-eye display device as described in Embodiment 1, the electronic component assemble further includes the multiple electronic modules which are electrically connected with each other as follows: a micro processor module, a motion sensor module, an active micro power module, a wireless communication module and a micro camera module, wherein the motion sensor module includes an electronic compass, an electronic gyroscope and an electronic accelerometer.

Embodiment 8 the near-eye display device as described in Embodiment 7, the micro camera module further includes a micro camera lens configured in the containing space.

Embodiment 9 the near-eye display device as described in Embodiment 7, the micro processor module further includes an application program installed therein, to selectively perform one of magnetic north search and correction schemes as follows: a first scheme which is a compass based scheme, if there is none of other electromagnetic interferences occurring around a near field of the near-eye display device; a second scheme which is an imaged recognition based scheme, if there is an internet connection is available or if there are electromagnetic interferences occurring around a near field of the near-eye display device; and a third scheme which is a GPS based scheme, if a GPS signal is detectable by the external device.

Embodiment 10 the near-eye display device as described in Embodiment 7 is capable of connecting to one of a cloud network and a grid computing resource via the wireless communication module.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A near-eye display device, comprising:
   a main case providing a containing space to include a micro processor, an electronic compass, an accelerometer and a gyroscope, wherein the micro processor performs an application program of cooperating with the electronic compass, the accelerometer and the gyroscope to keep searching a direction toward a magnetic north;
   a see-through display unit mechanically connected with the main case and electrically connected with the micro processor, wherein the see-through display unit receives an information about the direction toward the magnetic north and shows the information for the user, so as to cause the near-eye device having a capability of keeping tracking the direction toward the magnetic north and keeping showing it on the see-through display for the user to see; and
   an attaching unit configured on the main case to cause the near-eye display device to detachably assemble to the user's own ordinary spectacle for daily use having a spectacle-based frame.

2. The near-eye display device as claimed in claim 1 further comprising one of units as follows:
   a rotatable connection unit, by which the see-through display unit is mechanically and rotatably connected with the main case;
   a flipable connection unit, by which the see-through display unit is mechanically and flipably connected with the main case; and
   an external device connecting port for electrically connecting with an external device.

3. The near-eye display device as claimed in claim 2, wherein the external device connecting port is selected from a universal serial bus on-the-go (USB-OTG) connecting port and a Thunderbolt connecting port.

4. The near-eye display device as claimed in claim 2, wherein the external device is one selected from a smart phone, a tablet and a notebook computer.

5. The near-eye display device as claimed in claim 1, wherein the attaching unit is one selected from a groove based component, a clip based component, a clamp based component and a hook-loop fastener, wherein the groove based component has a groove having a cross-section formed with a curved shape or a rectangular shape.

6. The near-eye display device as claimed in claim 1, wherein the see-through display unit is electrically connected with the electronic component assemble by a flexible water-resistance electrical connector.

7. The near-eye display device as claimed in claim 2, wherein the electronic component assemble further comprises the multiple electronic modules which are electrically connected with each other as follows: a micro processor module, a motion sensor module, an active micro power module, a wireless communication module and a micro camera module, wherein the motion sensor module comprises an electronic compass, an electronic gyroscope and an electronic accelerometer.

8. The near-eye display device as claimed in claim 7, wherein the micro camera module further comprises a micro camera lens configured in the containing space.

9. The near-eye display device as claimed in claim 7, wherein the micro processor module further comprises an application program installed therein, to selectively perform one of magnetic north search and correction schemes as follows:
   a first scheme which is a compass based scheme, if there is none of other electromagnetic interferences occurring around a near field of the near-eye display device;
   a second scheme which is an imaged recognition based scheme, if there is an internet connection is available or if there is electromagnetic interferences occurring around a near field of the near-eye display device; and
   a third scheme which is a GPS based scheme, if a GPS signal is detectable by the external device.

10. The near-eye display device as claimed in claim 7 being capable of connecting to one of a cloud network and a grid computing resource via the wireless communication module.

* * * * *